United States Patent [19]

Pieton

[11] 4,055,251
[45] Oct. 25, 1977

[54] PORTABLE BLAST FURNACE SLAG BENEFICIATING PLANT

[75] Inventor: James L. Pieton, Girard, Ohio

[73] Assignee: McEsco Inc., McDonald, Ohio

[21] Appl. No.: 638,354

[22] Filed: Dec. 8, 1975

[51] Int. Cl.² .............................................. B03C 1/30
[52] U.S. Cl. .................................... 209/38; 209/219
[58] Field of Search .......................... 209/38, 420, 421; 241/24, 76, 219, DIG. 38; 198/233, 854, 863

[56] References Cited

U.S. PATENT DOCUMENTS

| | | | |
|---|---|---|---|
| 1,958,351 | 5/1934 | Shingshans | 209/38 |
| 2,366,536 | 1/1945 | Levin | 198/233 |
| 2,596,265 | 5/1952 | Manierre | 198/233 X |
| 2,721,035 | 10/1955 | Lankford | 209/38 X |
| 2,728,454 | 12/1955 | Heckatt | 209/38 |
| 2,814,387 | 11/1957 | McWilliams | 209/421 X |
| 3,235,078 | 2/1966 | Hostetter | 209/421 X |
| 3,272,330 | 9/1966 | Nelson | 209/38 |
| 3,297,148 | 1/1967 | Andrews | 198/233 |
| 3,335,968 | 8/1967 | Young | 241/76 X |
| 3,557,939 | 1/1971 | Lyons | 198/233 X |
| 3,724,168 | 4/1973 | Cassady | 198/233 X |

*Primary Examiner*—Robert Halper
*Attorney, Agent, or Firm*—Webster B. Harpman

[57] ABSTRACT

A portable slag beneficiating plant comprises lengthwise adjacent first and second stage sizing devices with an intermediate magnetically operated separating unit arranged to deliver separated metallics to the second stage sizing device and to deliver the separated non-metallic slag to a conveyor for remote accumulation. The first and second stage sizing devices in the slag beneficiating plant and the magnetic separating unit which incorporates a feed conveyor belt and the disposal slag conveyor are individually operated by hydraulic motor subject to the control of individual valves and supplied from a common source of hydraulic fluid pressure enabling the individual sizing separating and conveying devices in the portable slag beneficiating plant to be operated at different speeds and capacities manually variable continuously to expedite rapid and efficient handling of large quantities of slag by the plant.

5 Claims, 5 Drawing Figures

PORTABLE BLAST FURNACE SLAG BENEFICIATING PLANT

BACKGROUND OF THE INVENTION

1. Field of the Invention

This invention relates to installations for processing steel making slag and refuse to reclaim reuseable metallics therefrom.

2. Description of the Prior Art

Plants of this type have largely resorted to various crushing devices incorporated with sizing and various forms of magnetic separation. See for example U.S. Pat. Nos. 3,178,122, in which magnetic separating drums are employed, and 2,971,703 in which a conveyor belt and magnetic pulley metallic separator is disclosed. No prior art is known wherein the various lengthwise arrangement of sizing and separating devices are individually controlled with respect to rate of travel of the material being processed and the variants of capacity inherent therewith.

This invention advantageously locates the sizing and separation stages in a portable slag beneficiating plant and provides for the individual control of the several stages by the variable drive arrangement in the flexible hydraulic drive means disclosed.

Summary of the Invention

A portable slag beneficiating plant arranges a receiving hopper and a first sizing stage at one end of a lengthwise assembly which includes a second sizing stage and an intermediate metallic and slag separating unit with the separated metallics being processed by the second sizing stage and the metallic and slag separating unit delivering the separated slag to a lengthwise conveyor for remote disposal.

DESCRIPTION OF THE PREFERRED EMBODIMENT

Figure 1:
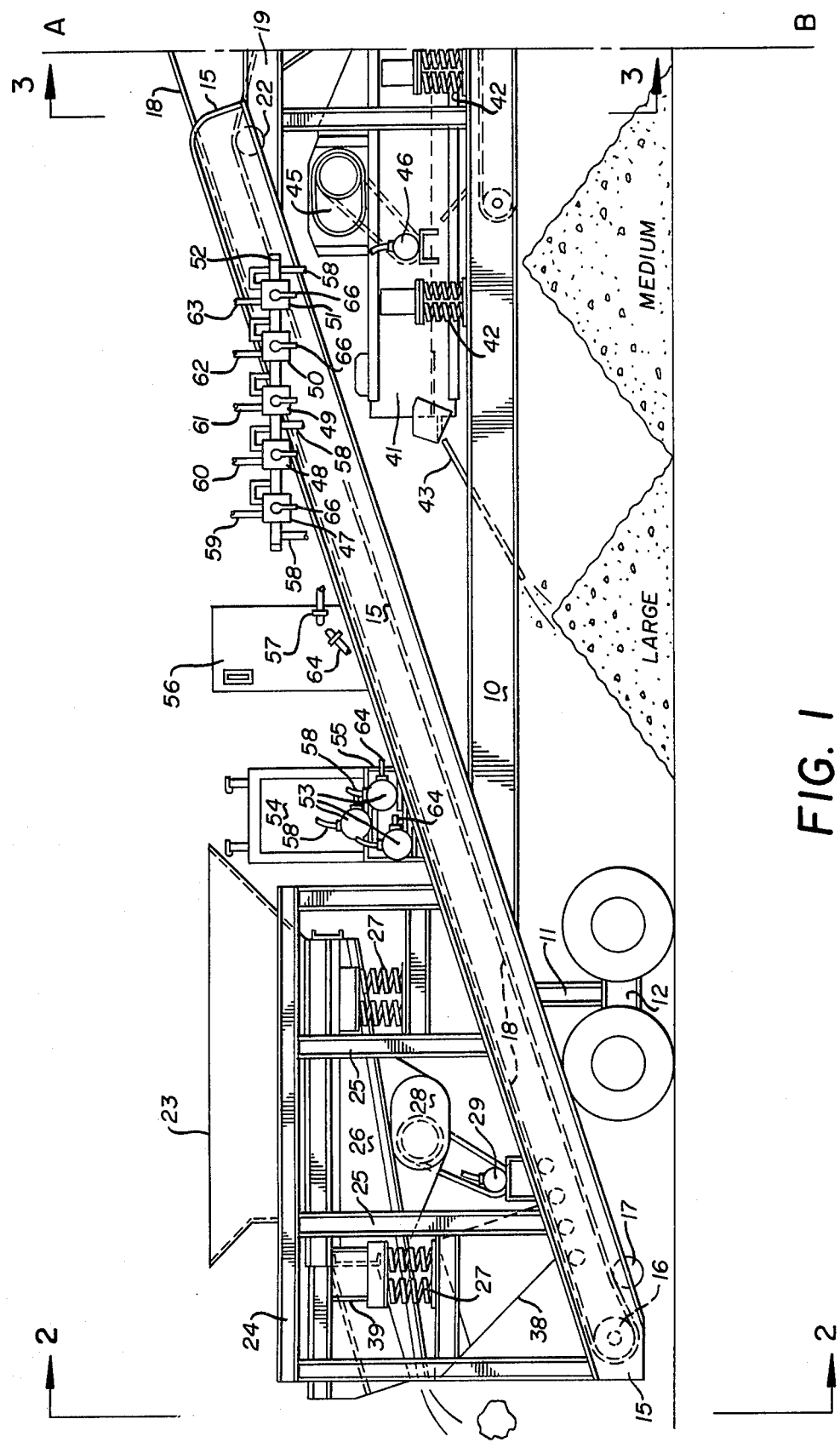
FIG. 1 is a side elevation of the center and left hand portion of a portable slag beneficiating plant.
Figure 1A:
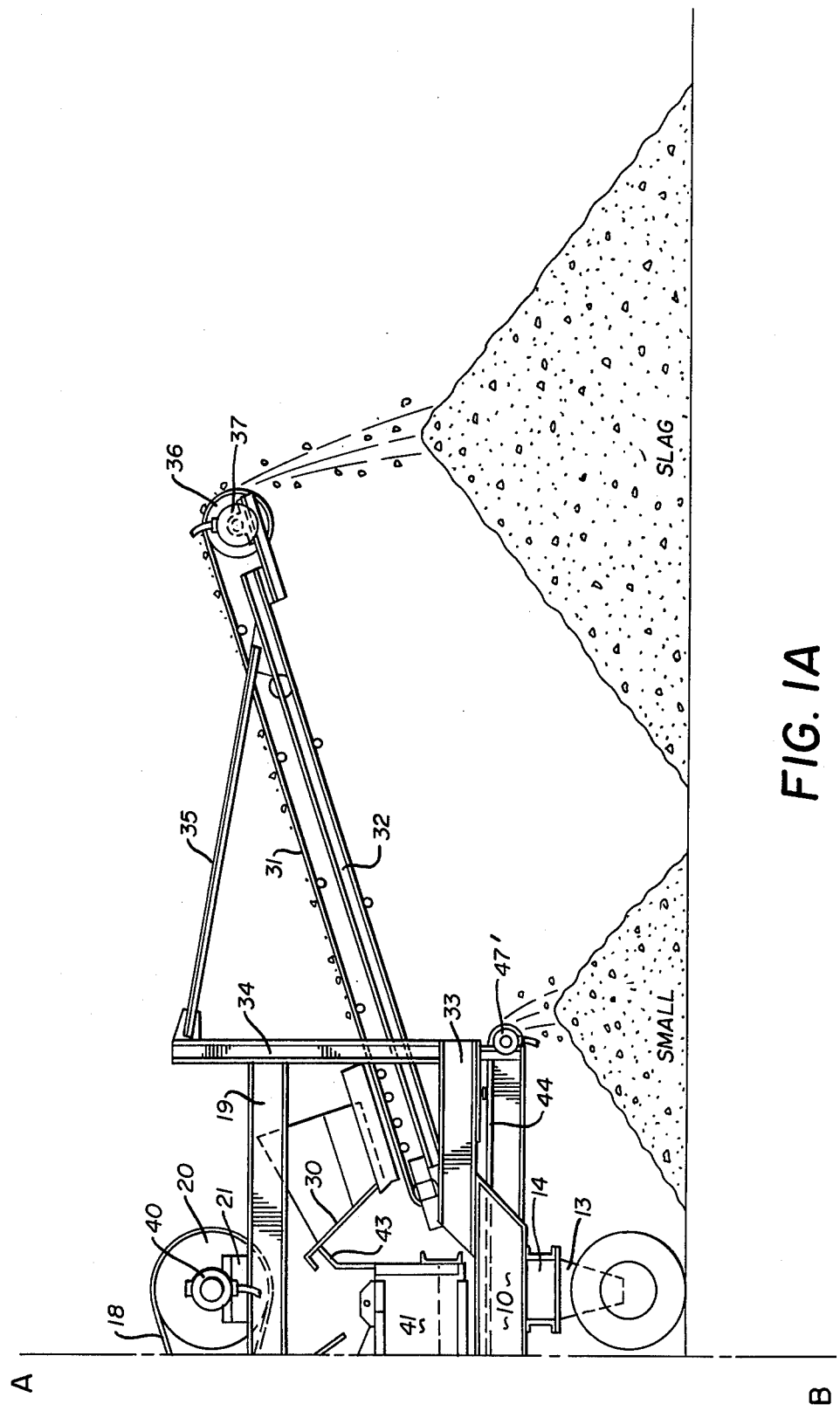
FIG. 1A is a side elevation of the right end portion of the slag beneficiating plant of FIG. 1, lines AB on FIGS. 1 and 1A indicating the continuation.

By referring to FIGS. 1 and 1A of the drawings, as positioned in end to end arrangement, it will be seen that the form of the invention chosen for illustration herein comprises a main horizontal frame 10 supported adjacent its left end by a sub-frame 11 and a pair of tandem wheel and axle assemblies 12. The other, or right end, of the portable slag beneficiating plant is supported by a steerable wheel and axle assembly 13 carried on a secondary sub-frame 14. A separable tow bar, not shown, may be used to move the portable slag beneficiating plant at a mill site or other location as will occur to those skilled in the art.

By referring to FIG. 1 in particular and the left end thereof, it will be observed that an angular frame 15 extends downwardly to the left and directly supports a conveyor belt pulley 16 and an adjacent tensioning idler 17 over which a first conveyor belt 18 is trained. The angularly disposed frame 15 extends both downwardly to the left end of the slag beneficiating plant as seen in FIG. 1 of the drawings and upwardly therefrom to a second horizontal frame 19 which directly supports a magnetic separation pulley 20 by means of journals 21 carried on the second horizontal frame 19.

The first conveyor belt 18 is trained over the magnetic separation pulley 20 and it will be observed that the magnetic separation pulley 20 is of relatively large diameter as compared with the pulley 16. An idler pulley 22 carried on the angular frame 15 adjacent the upper end thereof causes the first conveyor belt 18 to adhere to a substantial portion of the surface of the magnetic separation pulley 20 as best seen in FIG. 1A of the drawings.

By referring again to FIG. 1 of the drawings, and the left end thereof, it will be seen that a hopper 23 is supported on a third horizontal frame 24 which in turn is carried on a plurality of vertical frame members 25 so as to position it in elevated relation to the angular frame 15 and the first conveyor belt 18 which travels therealong. Immediately beneath the hopper 23 there is a first grizzly 26 which has an inclined surface extending to the left as seen in FIG. 1 and as will be understood by those skilled in the art, comprises an arrangement of spaced bars secured to a frame which in turn is supported on a plurality of springs 27 and provided with an eccentric vibrating device 28 driven by a first hydraulic motor 29.

The spaced bars from the initial sizing and separating of the slag as dumped thereinto which usually includes large chunks and sometimes skulls which are chunks of ferrous metal. The spaced bars have vertical vanes on some of them which are open at the left end as seen in FIG. 1 and the bars which form the lower surface of the grizzly 26 are inclined toward the lower left end of the device as seen in FIG. 1. Thus chunk separation occurs with the large chunks being ejected to the left. The remaining pieces which are partially broken and sized drop onto the first conveyor belt 18 and are carried upwardly to the right thereof by the first conveyor belt 18 and pass over the magnetic separator pulley 20 and by referring to FIG. 1A of the drawings, it will be observed that the slag, which is non-metallic, flows off the end of the first conveyor belt 18 as it passes over the upper outer one-fourth of the magnetic separator pulley 20 and falls into a secondary hopper 30 which directs it downwardly and to the right as seen in FIG. 1A and onto a second conveyor belt 31. This conveyor belt 31 is supported on a conveyor frame 32 which is pivoted to a sub-frame assembly 33 at its inner end, beneath the hopper 30 and which includes a vertical section 34. Tie rods 35 extend from the upper end of the vertical section 34 to a point near the outer end of the conveyor frame 32. A driving pulley for the second conveyor belt 31 is at the outer end of the conveyor frame 32 and is indicated by the numeral 36 and it is directly driven by a variable speed hydraulic motor 37. The slag carried outwardly by the second conveyor belt 31 is deposited in a slag pile beneath the outer end of the second conveyor belt and is generally in the form considered useable as a commercial slag as for example in Portland concrete and asphaltic concrete, etc.

Those skilled in the art will observe that the slag thus separated and sized by the portable slag beneficiating plant disclosed herein may be further sized and/or crushed for other commercial uses if desired.

Figure 2:
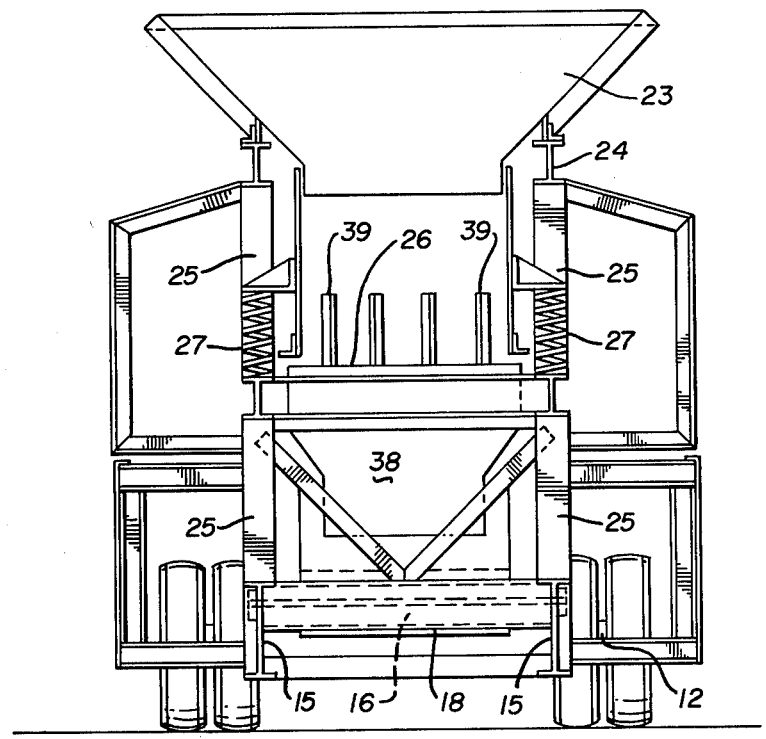
FIG. 2 is an end elevation on line 2—2 of FIG. 1.

By referring to FIG. 2 of the drawings, an end elevation on line 2—2 of FIG. 1 may be seen and the arrangement of the receiver hopper 23 and grizly 26 more clearly illustrated, there is a collecting and guiding sub-structure 38 disposed beneath the grizzly 26 so that the material passing through the grizzly 26 will be delivered to the first conveyor belt 18. The vertical flanges which are thicker at their right hand ends as seen in FIG. 1 of the drawings, will be seen standing vertically on the inclined bar structure of the grizzly 26 where they are indicated by the numeral 39.

Figure 3:
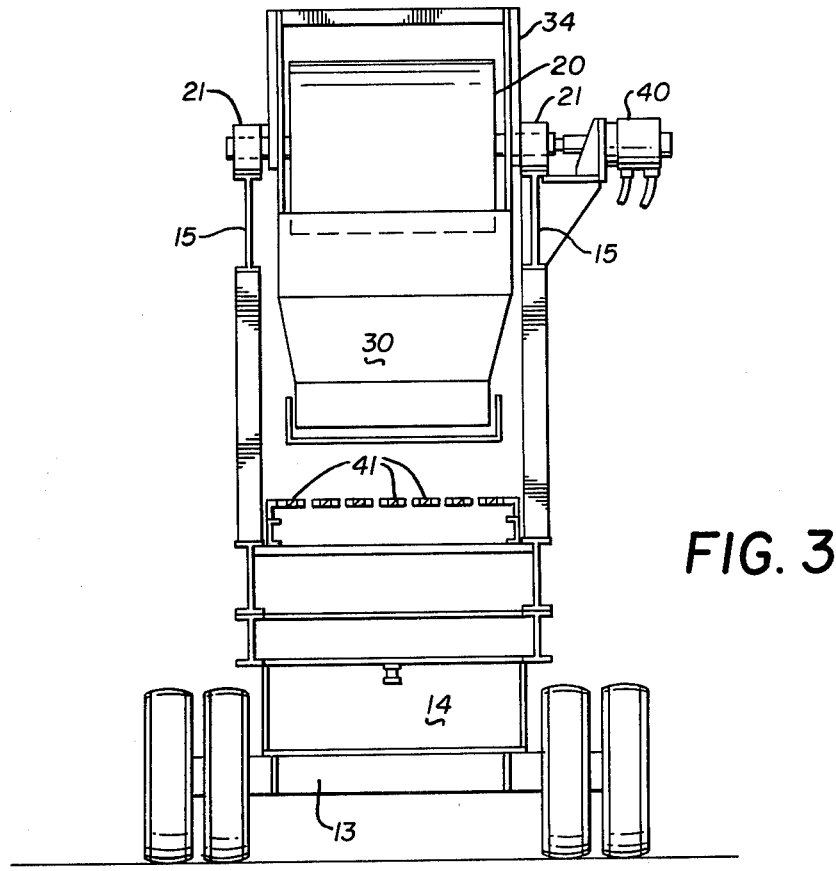
FIG. 3 is a vertical section on line 3—3 of FIG. 1.

By referring now to FIG. 3 of the drawings a vertical section on line 3—3 of FIG. 1 showing the right hand end thereof and the left end of FIG. 1A may be seen and it will be observed that the magnetic separating pulley 20 rotatable in its journals 21 is directly driven by a third hydraulic motor 40. The second hopper 30, which is disposed partially therebeneath may also be seen.

By referring to the right hand portion of FIG. 1 and the left hand portion of FIG. 1A it will be seen that a second grizzly 41 is positioned on springs 42 on the principal horizontal frame 10 with a portion thereof beneath the magnetic separation pulley 20. A guide 43 extends between the hopper 30 and the right hand end of the second grizzly 41 to direct the separated metallic particles thereonto. This second grizzly 41 also includes a plurality of transversely spaced longitudinally extending bars which are arranged with narrower spaces therebetween at their right hand end as seen in FIGS. 1 and 1A and relatively wider spaces therebetween at their left end as seen in FIGS. 1 and 1A so that the metallic particles delivered to the right end will result in a first separation of small metallic scrap from fines to one-half inch in size and as the grizzly operates it moves the metallics to the left as seen in FIGS. 1 and 1A so that the next largest sizes, those metallic pieces between ½ and 3 inches in diameter, are next separated while the larger pieces, those over 3 inches, are conveyed by the grizzlys shaking and conveying action to the left end thereof as in FIG. 1 and onto an angular guide 43 which delivers them to a point of accumulation adjacent the tandem wheel and axle assemblies 12 of the slag beneficiating plant.

The middle sized metallic particles fall directly from the grizzly 41 to a pile immediately therebeneath and the fines and particles up to a half inch in size fall onto a third conveyor belt 44 which travels them to the right as seen in FIGS. 1 and 1A to a point of accumulation beneath the sub-frame 33 and the inner end of the second conveyor belt 31.

The second grizzly 41 includes an eccentric vibrating device 45 and it is driven by a fourth hydraulic motor 46. The last mentioned conveyor belt 44 which receives the smallest metallic particles is driven by a fifth hydraulic motor 47'.

It will thus be seen that the slag including all sizes from fines to large chunks along with metallics of varying sizes is initially delivered into the beneficiating plant by the hopper 23, that the first sizing and separation occurs in the first grizzly 26 with the metallic and slag separation occuring at the magnetic separating pulley 20 while the second grizzly 41 classifies the metallic particles by size and the second conveyor belt 31 delivers the slag to the far opposite of the slag beneficiating plant.

In order that various slags with various metallic contents and in varying amounts may be quickly and efficiently handled by the portable slag beneficiating plant disclosed herein, the five hydraulic motors 29, 37, 40, 46 and 47' which individually drive the five critical moving parts of the slag beneficiating plant are individually controlled by five separate control valves 47, 48, 49, 50 and 51 mounted on a common manifold 52 which communicates by way of power piping and flexible connections with three hydraulic pumps 53 which are driven by a suitable power source such as an internal combustion engine 54. The engine 54 and the pumps 53 are carried on a transverse member 55 supported on the angularly disposed frame 15 which has heretofore been referred to as supporting and positioning the first conveyor belt 18 as it directly supports a plurality of rollers which in turn support and shape the conveyor belt 18 as will be understood by those skilled in the art.

A fluid reservoir 56 is positioned adjacent the engine 54 and the pumps 53 are in communication therewith, it receives return lines 57 which communicate with the hydraulic motors 29, 37, 40, 46 and 47' respectively.

Figure 4:
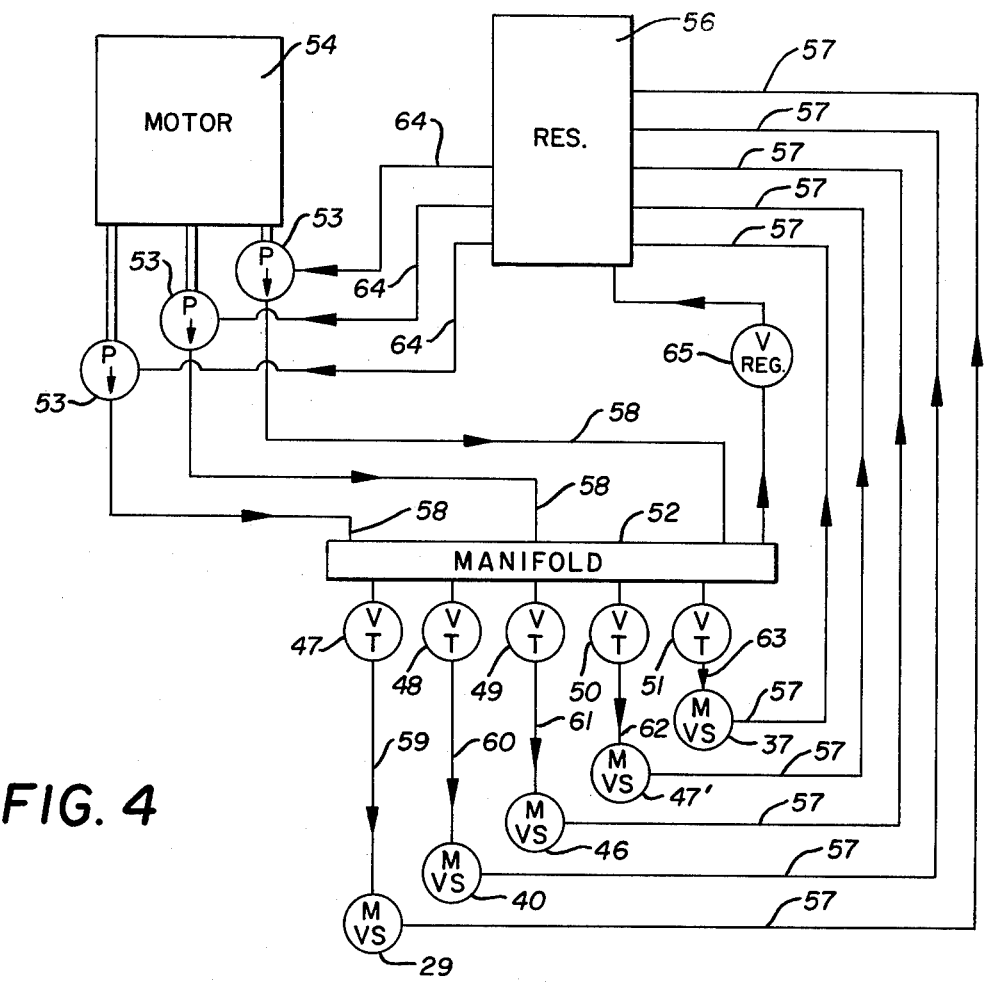
FIG. 4 is a symbolic diagram of the hydraulic drive and individual motor control for the several hydraulic driving motors in the slag beneficiating plant.

By referring now to FIG. 4 of the drawings, a schematic diagram of the hydraulic system may be seen. It will be observed that the pumps 53 supply hydraulic fluid under pressure through communicating lines 58 to the manifold 52 at spaced intervals therealong to insure the maintenance of even hydraulic pressure therein at all times.

The valves 47 – 51 which are continuously variable hydraulic valves communicate directly with the manifold 52 and with the hydraulic motors 29, 40, 46, 47' and 37 respectively by way of hydraulic lines 59, 60, 61, 62 and 63 and the return flow from the respective hydraulic motors is by the return lines 57 heretofore referred to, which as hereinbefore noted communicate directly with the reservoir 56. The pumps 53 communicate with the reservoir 56 by way of hydraulic lines 64. The manifold 52 communicates directly with the reservoir 56 by way of a constant pressure inlet valve 65. Levers 66 on the valves 47 through 51 respectively provide for the individual manual control thereof and therefore enable the operator to manually control the speed of the several hydraulic motors and thus the speed of the first grizzly 26, the first conveyor belt 18, the second grizzly 41, the second conveyor belt 31 and the fourth conveyor belt 44. The operator is provided with a platform on the main horizontal frame 10 so as to position him adjacent the control valves 47 – 51 respectively. From this position the operator can observe the amount and condition of the slag being put into the hopper 23 and he can vary the operation of the first grizzly 26 responsive to the particular needs of the material being processed. For example speeding up the first grizzly 26 will cause a more rapid break up and sizing of large chunks of slag and slowing it down will vary the rate of the material being delivered to the first conveyor belt 18. Controlling the speed of the conveyor belt 18 by varying the speed of rotation of the magnetic separating pulley 20 through the control of the third hydraulic motor 40 enables a more efficient separation of slag and metallics to take place as speed of delivery of the metallics to the matnetic separating pulley affects the disposition and placing of the metallics relative thereto. The varying of the speed of the second grizzly 41 again responsive to the condition of the material being handled assures the more accurate sizing of the metallic particles as hereinbefore described and varying the speed of the conveyor 44 and the slag discharge conveyor 31 accommodate varying volumes and speeds of materials being processed. Thus, a high rate of efficiency of metallic and slag separation is more readily obtained due to the flexability of control occasioned by the individual hydraulic control of the several driving motors which operate the various portions of the portable slag beneficiating plant.

A plant formed in accordance with this invention efficiently handles steel mill slag at the rate of 200 tons per hour with a very high metallic and slag separation and the very desirable sizing and classification of the metallics separated in the plant.

Although but one embodiment of the present invention has been illustrated and described, it will be apparent to those skilled in the art that various changes and modifications may be made therein with out departing from the spirit of the invention.

Having thus described my invention what I claim is:

1. In a portable slag beneficiating plant for processing steel mill slag and separating metallic pieces therefrom and classifying the metallic pieces as to particle size, a frame, a feed hopper on said frame, support springs on said frame, an inclined grizzly on said support springs and positioned beneath said feed hopper, an eccentric device attached to said inclined grizzly for oscillating the same, a magnetic separating roll and a conveyor belt extending from beneath said inclined grizzly to and trained over said magnetic separating roll and arranged to drive the same, second support springs on said frame, a second grizzly on said second support spring and positioned beneath said magnetic separating roll, a second eccentric device attached to said second grizzly for oscillating the same, said second grizzly arranged to receive metallic pieces from said magnetic separating roll and a second belt conveyor extending from beneath a portion of said second grizzly to a point adjacent one end of said frame, a source of fluid pressure, a hydraulic motor connected to said first mentioned eccentric device for actuating the same, a second hydraulic motor connected to said eccentric device for actuating the same, a third hydraulic motor connected to said magnetic separating roll for driving the same and the first mentioned conveyor belt and a fourth hydraulic motor connected to said second conveyor for moving the same, hydraulic piping interconnecting said source of fluid pressure and said hydraulic motors individually and throttle valves controlling said piping whereby said hydraulic motors may be individually controlled by the individual manipulation of said throttle valves.

2. The portable slag beneficiating plant set forth in claim 1 and wherein a third conveyor is disposed beneath said second grizzly and said second grizzly is arranged to separate metallic pieces into at least three size ranges, said second conveyor belt positioned to receive one of said three size ranges of metallic pieces and convey them to a point spaced with respect to said second grizzly.

3. The portable slag beneficiating plant set forth in claim 1 and wherein said first and second grizzlys include spaced bars, vertical vanes on the bars of said first grizzly, the bars of the second grizzly being wider and hence more closely spaced at their ends beneath said magnetic separator roll with respect to their opposite ends.

4. The portable slag beneficiating plant set forth in claim 1 and wherein said throttle valves are positioned in a group at a location on said plant from which the feed hopper, the grizzlys and the magnetic separator roll are visible.

5. The portable slag beneficiating plant set forh in claim 1 and wherein said conveyor extends from a point below said first grizzly on an incline upwardly to said magnetic separating roll.

* * * * *